(12) United States Patent
Lee et al.

(10) Patent No.: US 10,723,411 B2
(45) Date of Patent: Jul. 28, 2020

(54) TORQUE DETECTION DEVICE OF REAR FRAME FOR ELECTRICALLY ASSISTED BICYCLE

(71) Applicant: NATIONAL CHENG KUNG UNIVERSITY, Tainan (TW)

(72) Inventors: Sen-Yung Lee, Tainan (TW); Cho-Yin Lee, Tainan (TW)

(73) Assignee: National Cheng Kung University, Tainan (TW)

( * ) Notice: Subject to any disclaimer, the term of this patent is extended or adjusted under 35 U.S.C. 154(b) by 306 days.

(21) Appl. No.: 15/834,478

(22) Filed: Dec. 7, 2017

(65) Prior Publication Data
US 2018/0229800 A1  Aug. 16, 2018

(30) Foreign Application Priority Data
Feb. 10, 2017  (TW) .............................. 106104386 A

(51) Int. Cl.
*G01N 31/22* (2006.01)
*G06F 15/00* (2006.01)
(Continued)

(52) U.S. Cl.
CPC ................ *B62M 6/50* (2013.01); *G01L 3/10* (2013.01); *G01L 3/1464* (2013.01); *G01L 5/10* (2013.01); *G01L 5/108* (2013.01)

(58) Field of Classification Search
CPC ........ B62M 6/50; G01L 3/1464; G01L 5/108; G01L 3/10; G01L 5/10; B62J 2099/002; B62J 99/00; B62K 19/30
See application file for complete search history.

(56) References Cited

U.S. PATENT DOCUMENTS

| 4,595,213 A | * | 6/1986 | Tsuchie | ................... | B62H 7/00 |
| | | | | | 280/293 |
| 5,279,524 A | * | 1/1994 | Hilber | ................... | B62M 1/105 |
| | | | | | 474/69 |

(Continued)

FOREIGN PATENT DOCUMENTS

TW        M412130 U    9/2011
TW        M422528 U    2/2012

*Primary Examiner* — Mohammad K Islam
(74) *Attorney, Agent, or Firm* — Rosenberg, Klein & Lee

(57) ABSTRACT

A torque detection device of a rear frame of an electrically assisted bicycle includes two displacement detection units and a processing unit. The displacement detection units are installed at upper and lower fork arms of the rear frame respectively for detecting and converting displacement into force. Through mechanical analysis and mathematical operations, the processing unit processes signals obtained by the displacement detection units to remove any force perpendicular to a road surface and obtain a rider's treading torque while pedaling a pedal crank module. The displacement detection units are mounted onto the upper and lower fork arms without requiring any rotary joint. The displacement detection units are displacement detection devices applying different physical and chemical methods, such as strain gauges, piezoelectric sensors, electromagnetic sensors, capacitive sensors, or optical sensors. The torque detection device features simple manufacture and device, and the advantage of measuring the treading torque accurately.

7 Claims, 4 Drawing Sheets

(51) Int. Cl.
 *B62M 6/50* (2010.01)
 *G01L 5/10* (2020.01)
 *G01L 3/10* (2006.01)
 *G01L 5/108* (2020.01)
 *G01L 3/14* (2006.01)

(56) References Cited

U.S. PATENT DOCUMENTS

| | | | | |
|---|---|---|---|---|
| 5,708,343 | A * | 1/1998 | Hara | B62M 6/45 318/139 |
| 6,320,336 | B1 * | 11/2001 | Eguchi | B62M 6/45 318/139 |
| 6,465,983 | B1 * | 10/2002 | Ogata | H02J 7/2434 318/811 |
| 2002/0152836 | A1 * | 10/2002 | Wang | B62M 1/30 74/594.2 |
| 2005/0199075 | A1 * | 9/2005 | Tokoro | B62M 6/50 73/862.333 |
| 2008/0032871 | A1 * | 2/2008 | Yeh | A63B 21/0023 482/54 |
| 2009/0120211 | A1 | 5/2009 | Roovers et al. | |
| 2009/0212524 | A1 * | 8/2009 | Lee | B62K 3/005 280/226.1 |
| 2010/0230925 | A1 * | 9/2010 | Thielbar | B62K 5/00 280/221 |
| 2012/0212161 | A1 * | 8/2012 | Takeuchi | H02P 6/24 318/376 |
| 2014/0027988 | A1 * | 1/2014 | Olems | B60G 17/016 280/5.515 |
| 2014/0166384 | A1 * | 6/2014 | Ishida | B62M 6/50 180/206.3 |

* cited by examiner

TORQUE DETECTION DEVICE OF REAR FRAME FOR ELECTRICALLY ASSISTED BICYCLE

FIELD OF INVENTION

The present invention relates to a torque detection device of a rear frame for an electrically assisted bicycle, in particular to the torque detection device having two displacement detection units installed to an upper fork arm and a lower fork arm of a rear frame of a rear wheel respectively and provided for detecting a displacement and convert it into force. Through mechanical analysis and mathematical operations, the processing unit processes the signals obtained by the displacement detection units to eliminate any force perpendicular to a road surface, so as to obtain the treading torque of a rider's legs during riding the bicycle. In addition, the invention requires no adapter for installation and features simple manufacture and device and accurate signal measurement, and has the effect of measuring a rider's treading torque easily.

BACKGROUND OF INVENTION

1. Description of the Related Art

Based on the requirements for environmental protection as well as an easy and comfortable ride, various different electrically assisted bicycles are available in the market, and the systems of the electrically assisted bicycles may be divided into a front wheel, rear wheel, and middle systems according to the position of installing an electrically assisted motor. To allow the motor to provide an appropriate auxiliary torque anytime, the torque sensor becomes one of the very important devices to the electrically assisted bicycle.

There are many conventional torque sensors, and most of them are installed to a crankshaft, a pedal, a pedal lever, a rear axle, a front sprocket, a chain, or a rear frame of the bicycle. However, most of these torque sensors have the following drawbacks. The conventional torque sensors can just transmit the treading torque of a leg and require an adapter or a wireless transmission device (including a battery), and the torque signal is unstable and may be interfered by external factors easily. In practical applications, such torque sensors are inconvenient, and unable to measure or control the torque easily.

The torque sensor installed to a pedal crankshaft, a pedal, or a pedal lever of a bicycle can just transmit the treading torque of one leg of the user, and requires a rotary adapter or a wireless transmission device (including a battery). Although the torque sensor installed at a rear axle or a front sprocket can transmit the treading torque of both legs of the user, yet the adapter or a wireless transmission device (including a battery) is required, and the torque signal is unstable and may be interfered by external factors easily. Although the torque sensor together with a link rod having a roller is mounted onto a chain can transmit a treading torque of both legs without requiring a rotary adapter or a wireless transmission device (including a battery), yet the torque signal may be interfered by an unsmooth chain, rough road surface, load or vibration very easily.

Therefore, a "Method and device for measuring the chain force in a bicycle" as disclosed in U.S. Pat. Publication No. 2009/0120211 was introduced, and two displacement sensors with a complicated design are installed at installed at junctions 22, 23 of the rear forks on both side of the rear frame and the rear axle. After two action forces (FL, FR) produced by the horizontal displacement are measured, they are added to each other to obtain the driving force of a chain. In FIG. 1, the rear fork end of the rear frame has two rear frames configured to be opposite to each other. Since any force N perpendicular to a road surface (such as the vertical component force of the weight of a man or a car, a load, an even road surface, or a chain driving force) is divided into component forces (FA, FB) along two different directions of the rear fork end of the rear frame. Wherein, the horizontal component force FA along the direction of the lower fork arm, the horizontal component force FB along the direction of the lower fork arm, and any force N perpendicular to a road surface have the mathematical relation given in the following Equations 1 and 2:

$F_A = N \tan \theta$ (Equation 1)

$F_B = N/\cos \theta$ (Equation 2)

The horizontal component force FA along the direction of the lower fork arm produces a horizontal displacement at the junction of the rear fork end of the rear frame and the rear axle. Therefore, the aforementioned patent comes with a complicated design of the torque sensor, and the horizontal displacement action force measured by the method naturally includes the component force of the force N perpendicular to road surface and along the direction of the horizontal displacement. In other words, the measured horizontal displacement action force may be interfered by the factors such as road surface, load, and vibration, so that the measurement will be inaccurate.

In view of the aforementioned drawbacks of the prior art, the inventor of the present invention based on years of experience in the related industry to conduct extensive research and experiment, and finally developed a torque sensor for electrically assisted bicycles in hope of overcoming the drawbacks of the prior art.

2. Summary of the Invention

Therefore, it is a primary objective of the present invention to overcome the drawbacks of the prior art by providing a rear frame torque sensor for electrically assisted bicycles, comprising:

a rear frame, having an upper fork arm and a lower fork arm installed thereon, and an included angle θ being defined between the upper fork arm and the lower fork arm, and an end of the upper fork arm and an end of the lower fork arm being coupled to each other and coupled to a rear axle, and the rear axle having a rear sprocket linked by a transmission unit (such as a chain) to connect and drive a front sprocket, and the lower fork arm having a treading torque module and the front sprocket disposed opposite to an end of the rear sprocket.

The rear frame torque sensor for an electrically assisted bicycle in accordance with the present invention comprises two displacement detection units and a processing unit, wherein the two displacement detection units are installed at an upper fork arm and a lower fork arm of the rear frame of a rear wheel. In addition, the first displacement detection unit and the second displacement detection unit may be a strain gauge, a piezoelectric sensor, an electromagnetic sensor, a capacitive sensor or an optical sensor, or any combination of the above. After the displacement detected by such displacement detection unit is analyzed by traditional theories and experiments and then converted into force.

In FIG. 1, any force (normal force N) perpendicular to road surface is divided into, component forces (FA, FB)

along two different directions of the rear fork end of the rear frame respectively, wherein FA represents the horizontal component force along the direction of the lower fork arm of the rear frame, and FB represents the component force along the direction of the upper fork arm of the rear frame. FA and FB have a mathematical relation as given below:

$$F_A = F_B \cos \theta$$

When a tension (T) is transmitted from the chain to the rear axle and exerted onto the front sprocket, the total force (F) along the direction of the lower fork arm of the rear frame measured by the second displacement detection unit is the resultant force of the force perpendicular to the road surface, the horizontal component force (FA) along the direction of the lower fork arm of the rear frame, and the tension (T) as elaborated in the following equation:

$$F = T + F_A$$

Since the direction of the tension (T) transmitted to the front sprocket through the chain is substantially the same as the direction of the horizontal component force (FA) along the lower fork arm of the rear frame, and the tension (T) has no component force along the direction of the upper fork arm of the rear frame, so that the component force (FB) along the upper fork arm of the rear frame of the rear wheel remains unchanged.

While a rider is riding, the total force (F) in the direction of the lower fork arm and the component force (FB) in the direction of the upper fork arm are measured, and then a processing unit computes the forces (F), (FB) and subtracts the component force (FB) along the direction of the upper fork arm of the rear frame and measured by the first displacement detection unit from the force (F) along the direction of the lower fork arm of the rear frame of the rear wheel and measured by the displacement detection unit, and then the result is multiplied by the force of cos θ (FB cos θ) to obtain a chain tension (T) which is not related to the force perpendicular to road surface as shown in the following equation:

$$T = F - F_A = F - F_B \cos \theta$$

After the tension (T) is multiplied by the radius of the front sprocket, the treading torque τ of a crankshaft acted on the fixed front sprocket can be obtained.

In the former, the axis of the lower fork arm is parallel to the horizontal line, so that if the direction of the lower fork arm of the rear frame of the rear wheel is not the horizontal direction, but has inclination δ an with respect to the horizontal line, then the parameters of the mathematical relation between FA and FB may be corrected as below:

$$F_A = \frac{\cos(\theta - \delta)}{\cos \delta} \times F_B = \alpha F_B$$

In general, the value of the inclination δ is not large, and its effect is neglectable.

If an error is caused by the assembling, manufacturing, material, cross-sectional area, measurement or any other physical factors, a calibration value c may be measured and obtained in an experiment without any chain tension (T):

$$c = F_B \cos \theta / F_A$$

In the rear frame torque sensor for an electrically assisted bicycle, the processing unit is coupled to a controller, and the controller is further coupled to a drive motor, and the controller is provided for controlling the processing unit according to the treading torque and other control conditions to drive the drive motor to supply an appropriate electrically assisted power.

In summation of the description above, the present invention has the following advantages and effects:

1. The present invention adopts the first displacement detection unit and second displacement detection unit to measure the deformations of the upper fork arm and lower fork arm respectively, so as to obtain a force receiving value of the upper fork arm and a force receiving value of the lower fork arm. In the vertical direction, the relation between the normal force N and the force receiving value FB of the upper fork arm may be used to eliminate a noise signal produced by the rough condition of a road surface. The measured force receiving value F of the lower fork arm may be used to obtain a rider's treading torque. Obviously, the present invention can eliminate noises to calculate the treading torque of the rider's leg accurately.

2. In the present invention, the processing unit generates a calibration value to perform a calibration procedure when the thickness or cross-sectional area of the upper fork arm and the lower fork arm is different, so that when the transmission unit has not transmitted the tension, the force receiving value F of the lower fork arm is equal to the product of the upper fork arm force receiving value FB and the cosine value of the included angle. Obviously, the present invention is applicable for the electrically assisted bicycles with various types of rear frames.

3. The present invention is applicable for various types of present existing electrically assisted bicycles, and the invention simply requires to install the upper fork arm and lower fork arm of the rear frame to the first displacement detection unit and second displacement detection unit respectively, or coaxially installs a fixed frame with the displacement detection unit to the present existing rear frame, or attaches the fixed frame with the displacement detection unit directly to the original rear frame. The invention uses the processing unit to measure the treading torque by a mathematical method, so that the structure of the invention is simplified and the electrically assisted bicycle requires no significant modification, and thus achieving the effect of saving labor, time, and cost.

DESCRIPTION OF THE PREFERRED EMBODIMENTS

The above and other objects, features and advantages of this disclosure will become apparent from the following detailed description taken with the accompanying drawings.

Figure 1:
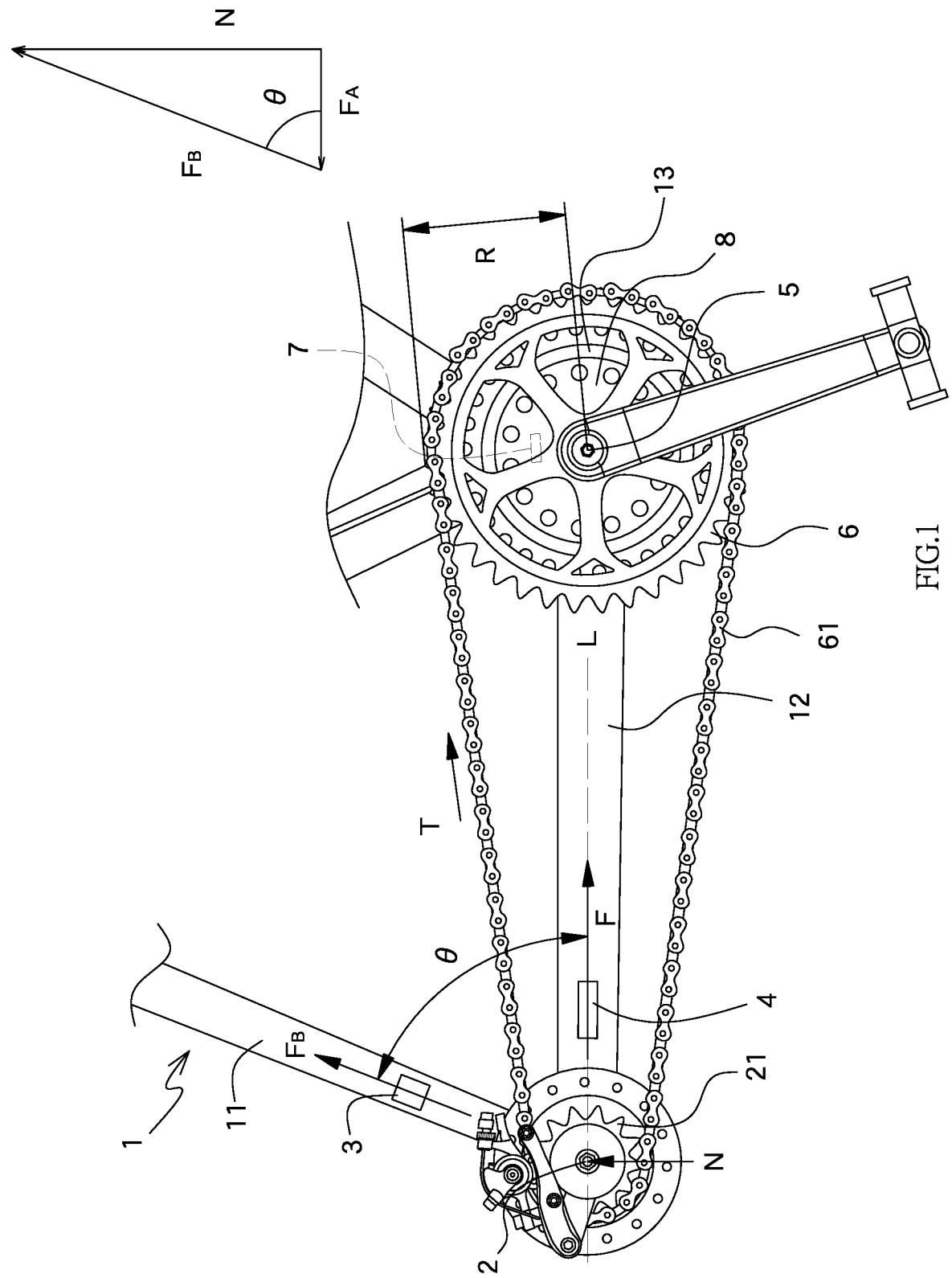
FIG. 1 is a schematic view showing the structure and mechanics of a first preferred embodiment of the present invention when a lower fork arm is parallel to the horizontal line.

With reference to FIG. 1 for a rear frame torque sensor of an electrically assisted bicycle in accordance with the first preferred embodiment of the present invention, the rear frame torque sensor comprises the following elements:

A rear frame 1 has an upper fork arm 11 and a lower fork arm 12 installed thereon, and an end of the upper fork arm 11 and an end of the lower fork arm 12 are coupled to each other, and an included angle θ is defined between the upper fork arm 11 and the lower fork arm 12, and a rear axle 2 is installed at the junction of the upper fork arm 11 and the lower fork arm 12, and the rear axle 2 has a rear sprocket 21, and the upper fork arm 11 has a first displacement detection unit 3, and the lower fork arm 12 has a second displacement detection unit 4, and the lower fork arm 12 has a treading torque module 5 and a front sprocket 6 disposed at an end opposite to the rear sprocket 21, and the front sprocket 6 is coupled by a transmission unit 61 and linked to the rear sprocket 21, wherein the transmission unit 61 is a chain.

A processing unit 7 is coupled to the first displacement detection unit 3 and the second displacement detection unit 4, and the processing unit 7 is further coupled to a controller (not shown in the figure), and the controller is further coupled to a drive motor 8, and the lower fork arm 12 has a multi-channel tube 13 disposed at an end opposite to the rear sprocket 21 and the multi-channel tube 13 is installed with the treading torque module 5, the front sprocket 6 and the drive motor 8.

Wherein, the first displacement detection unit 3 and the second displacement detection unit 4 are provided for detecting the deformation of the upper fork arm 11 and lower fork arm 12, so that the first displacement detection unit 3 and second displacement detection unit 4 of a preferred embodiment may be displacement detection devices simultaneously or individually adopting physical and chemical methods, such as a strain gauge, a piezoelectric sensor, an electromagnetic sensor, a capacitive sensor or an optical sensor.

As to the measurement of the deformation, the first displacement detection unit 3 and second displacement detection unit 4 may detect the displacement produced by deformation. In a preferred embodiment, the displacement detected by the first displacement detection unit 3 and the second displacement detection unit 4 are converted into a force receiving value FB of the upper fork arm 11 and a force receiving value F of the lower fork arm 12 respectively, and people having ordinary skill in the art should be able to use the relation between the sectional moment of inertia and the deformation displacement to obtain the receiving forces. Therefore, the present invention can use sectional moment of inertia of the upper fork arm 11 and the lower fork arm 12 stored in the processing unit 7 to obtain the force receiving value FB of the upper fork arm 11 and the force receiving value F of the lower fork arm 12 by the sectional moment of inertia according to the detection results detected by the first displacement detection unit 3 and the second displacement detection unit 4.

In FIG. 1, any normal force (N) perpendicular to a road surface can be divided into a component force FB of the upper fork arm 11 and a component force FA along the lower fork arm 12, and the mechanics naturally satisfies the condition as given in Mathematical Equation 1 below:

$$F_A = F_B \cos \theta;$$ [Mathematical Equation 1]

When a rider steps on the treading torque module 5 to drive the front sprocket 6, and the transmission unit 61 transmits at the rear sprocket 21, and the rear axle 2 receives the tension T transmitted from the front sprocket 6 through the transmission unit 61, and the force receiving value F detected by the second displacement detection unit 4 is the resultant force of the component force FA of the lower fork arm 12 of the normal force N and the aforementioned tension T as shown in Mathematical Equation 2 below:

$$F = F_A + T$$ [Mathematical Equation 2]

Since the direction of the tension transmitted from the front sprocket 6 through the transmission unit 61 is substantially the same as the direction of the component force FA of the lower fork arm 12 of the normal force N, so that the tension T has no component force along the direction of the upper fork arm 11, and the component force FB in the direction of the upper fork arm will remain unchanged.

While a rider is riding, the force receiving value F of the lower fork arm 12 is measured by the second displacement detection unit 4, and the force receiving value FB of the upper fork arm 11 is measured by the first displacement detection unit 3, and the processing unit 7 subtracts the component force FB in the direction of the upper fork arm 12 from the force receiving value F of the lower fork arm 12 and multiplies the result by the value of cos θ, which is equal to the result of subtracting the component force FA of the lower fork arm 12 of the normal force N, so as to obtain the chain tension T which is not related to the force perpendicular to a road surface and transmitted from the front sprocket 6 through the transmission unit 61 as shown in Mathematical Equation 3 below:

$$T = F - F_A = F - F_B \cos \theta;$$ [Mathematical Equation 3]

Therefore, the processing unit can calculate the treading torque τ, which is the product of the tension T and the radius R of the front sprocket 6 as shown in Mathematical Equation 4 below:

$$\tau = T \times R;$$ [Mathematical Equation 4]

Figure 2:
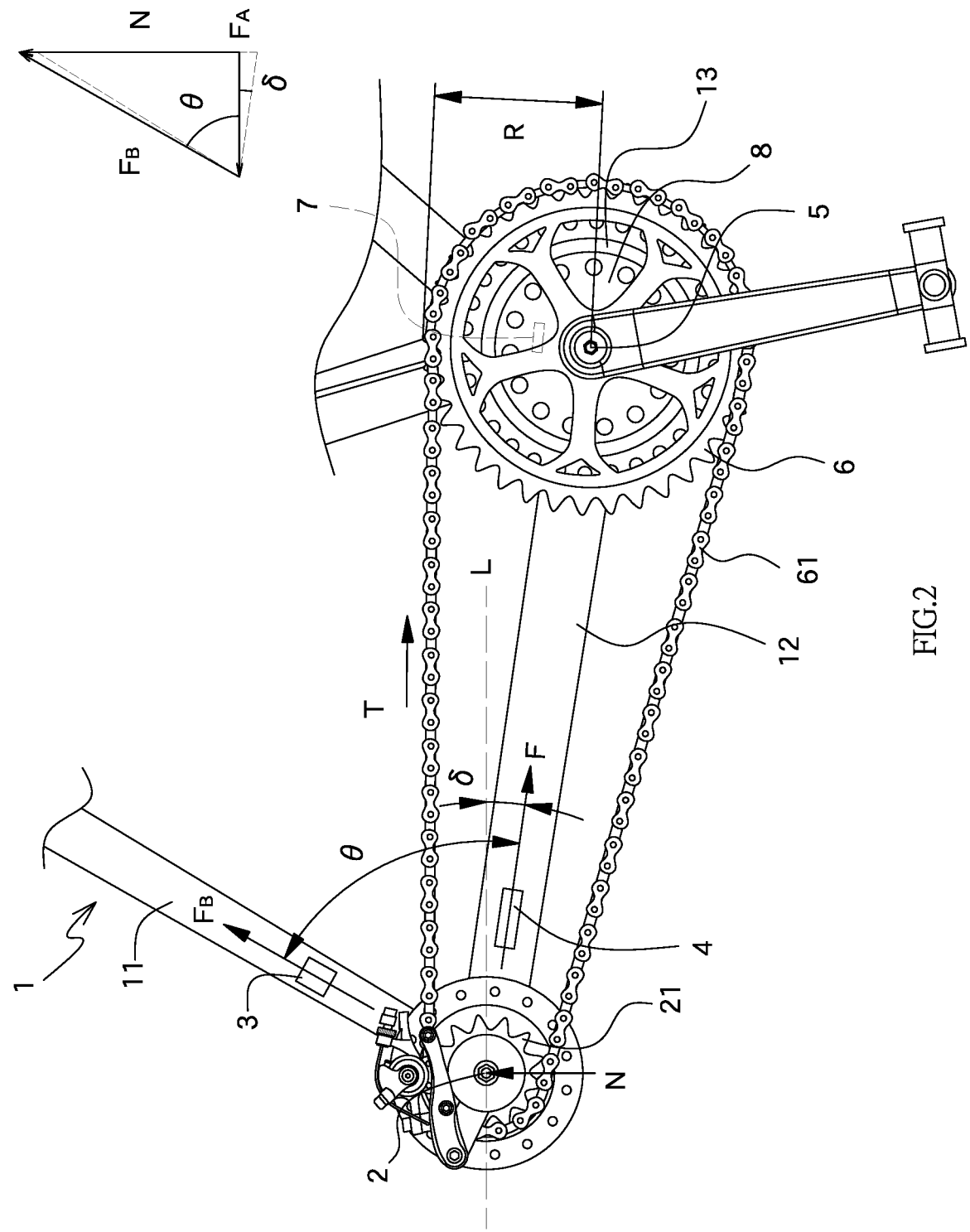
FIG. 2 is a schematic view showing the structure and mechanics of the first preferred embodiment of the present invention when a lower fork arm is parallel to the horizontal line.

Wherein, the axis of the lower fork arm 12 is parallel to horizontal line L. In FIG. 2, the axis of the lower fork arm 12 and the horizontal line L define an inclination δ, and it is necessary to correct the relation between FA and FB as shown in Mathematical Equation 5 below:

$$F_A = \frac{\cos(\theta - \delta)}{\cos \delta} \times F_B = \alpha F_B$$ [Mathematical Equation 5]

According to Mathematical Equations 3 to 5, the treading torque τ is corrected as shown in Mathematical Equation 6 below:

$$\tau = \left(F - F_B \frac{\cos(\theta - \delta)}{\cos \delta}\right) \times R$$ [Mathematical Equation 6]

It is noteworthy that if the sectional moments of inertia of both upper fork arm 11 and lower fork arm 12 are the same or different such as the shape or the cross-sectional area are different, then the processing unit 7 will perform a calibration procedure, and the tension T is equal to 0 and will not be acted onto the front sprocket 6 if the transmission unit has not transmitted the tension 5 in the calibration procedure, so that the force receiving value F of the lower fork arm 12 just includes the component force FA of the lower fork arm 12 of the normal force and will not be equal to the product of the force receiving value FB of the upper fork arm 11 and the cosine value of the included angle θ. Therefore, the processing unit 7 defines a calibration value c, and the product of the component force FA, or the force receiving value FB of the upper fork arm 11 and the cosine value of the included angle is multiplied by the calibration value c, so that the component force FA of the lower fork arm 12 is equal to the product of the force receiving value FB of the upper fork arm 11 and the cosine value of the included angle as shown in Mathematical Equation 7 below:

$$F_A = C \times F_B \cos \theta \text{ or } c \times F_A = F_B \cos \theta;$$ [Mathematical Equation 7]

After the calibration, the aforementioned procedure may be carried out, so that the calibration value c is taken into account o calculate the tension T and the treading torque τ, and the details have been described above and will not be repeated.

As to the mechanical balance in the vertical direction, the ground surface has given a normal force N to the rear wheel of the electrically assisted bicycle, so that the force receiving value FB of upper fork arm 11 along the vertical direction can be offset to eliminate any noise signal produced by the rough condition of the road surface as shown in Mathematical Equation 8 below:

$$N = F_B \sin \theta;$$ [Mathematical Equation 8]

Obviously, the present invention can eliminate noise signals, and calculate a rider's treading force F and treading torque τ, and the detection result of the present invention is not affected by external environmental conditions, so that the controller controls the processing unit 7 to drive the drive motor 8 to supply an appropriate electrically assisted power according to the treading torque τ and other control conditions, so as to maintain the stability of the operation of the present invention. In addition, the present invention comes with a simple structure and it simply requires to fix the first displacement detection unit 3 and the second displacement detection unit 4 to the upper fork arm 11 and the lower fork arm 12 respectively for the installation without requiring a significant modification of the rear frame 1. Obviously, the present invention has the features of accurate measurement and convenient installation.

Figure 3:
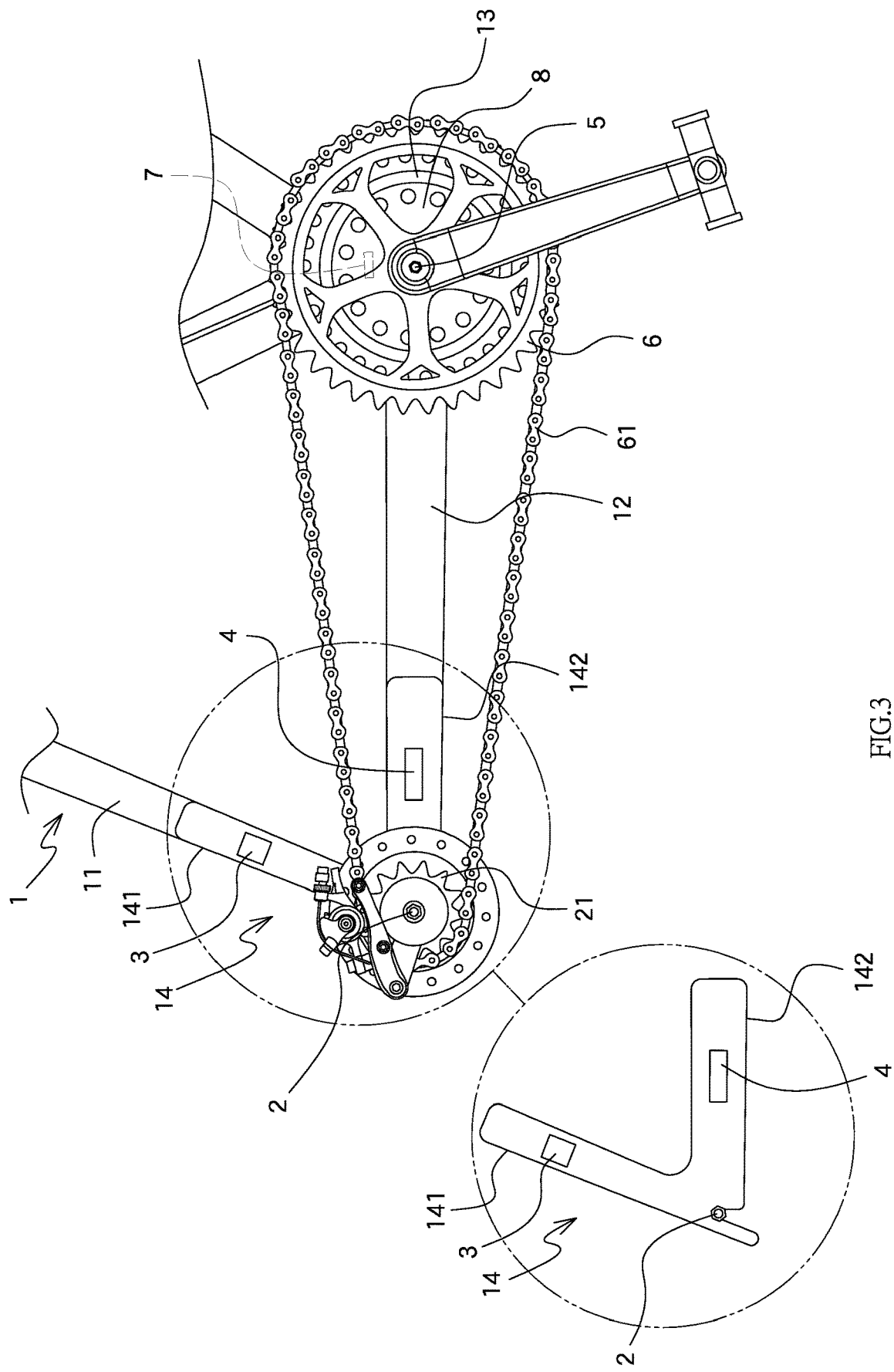
FIG. 3 is a schematic view showing the structure of a second preferred embodiment of the present invention.

It is noteworthy that the first displacement detection unit 3 of a preferred embodiment may be attached to the upper fork arm 11 of the rear frame 1 directly, and the second displacement detection unit 4 may be attached to the lower fork arm 12 directly. With reference to FIG. 3 for the second preferred embodiment of the present invention, and difference between the first and second preferred embodiments resides on that the second preferred embodiment further comprises a standalone fixed frame 14, and an end of the fixed frame 14 has an upper link arm 141 and a lower link arm 142, and the other end is installed to the rear axle 2, and the upper link arm 141 is engaged with the upper fork arm 11 of the rear frame 1, and the lower link arm 142 is engaged with the lower fork arm 12 of rear frame 1, and the first displacement detection unit 3 is installed to the upper link arm 141, and the second displacement detection unit 4 is installed to the lower link arm 142. Therefore, the treading torque can be calculated by the aforementioned method, and the implementation method of this preferred embodiment is similar to that of the first preferred embodiment, and thus will not be repeated.

Figure 4:
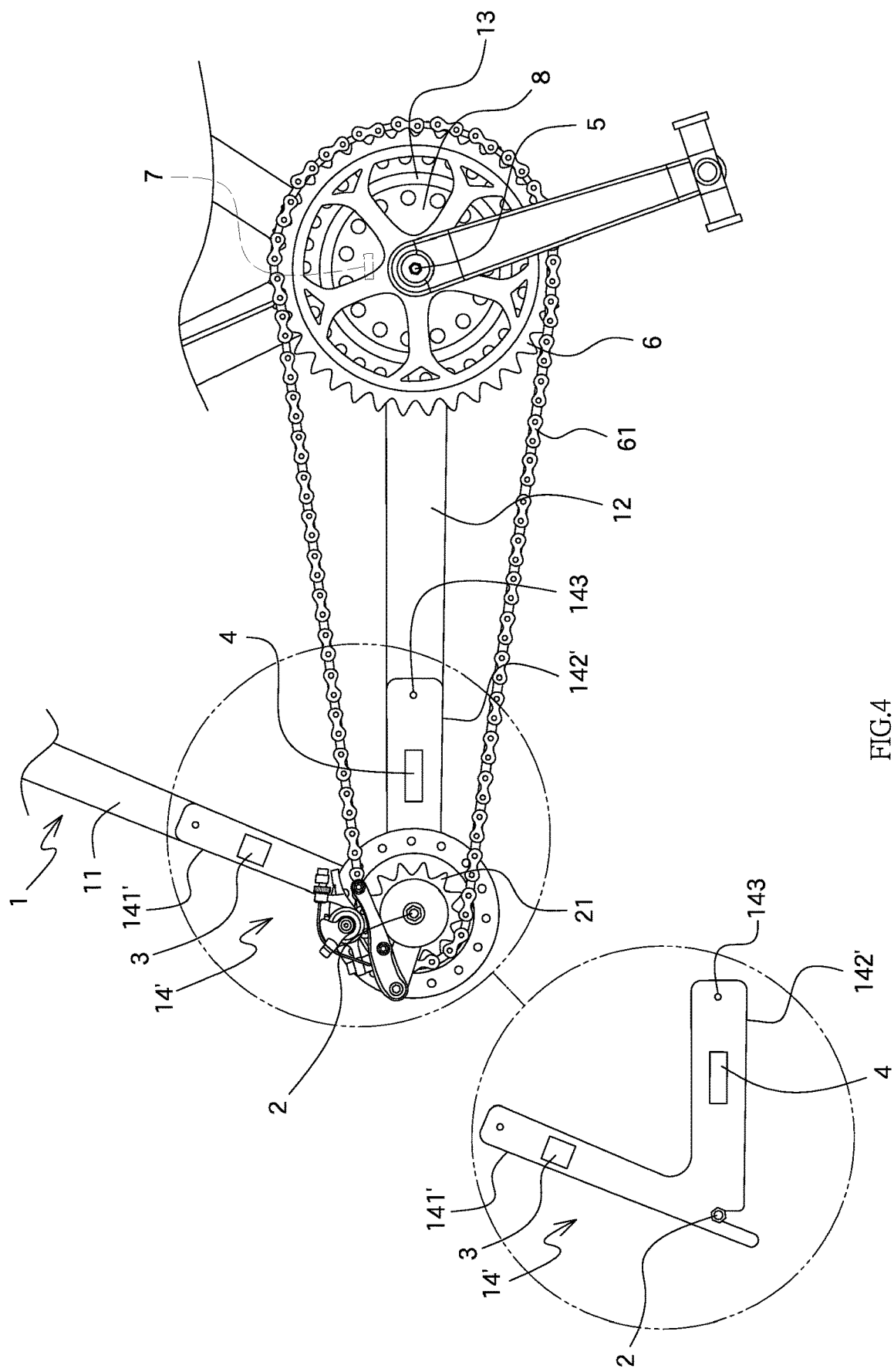
FIG. 4 is a schematic view showing the structure of a third preferred embodiment of the present invention.

With reference to FIG. 4 for the third preferred embodiment of the present invention, the difference between this preferred embodiment and the second preferred embodiment resides on that the third preferred embodiment has a standalone fixed frame 14' with an upper link arm 141' and a lower link arm 142' disposed at an end of the fixed frame 14', and the other end of the fixed frame 14' is coupled to a rear axle 2, and the upper link arm 141' is fixed to a side end of the upper fork arm 11, and the lower link arm 142' is fixed to a side end of the lower fork arm 12, and the first displacement detection unit 3 is installed to the upper link arm 141', and the second displacement detection unit 4 is installed to the lower link arm 142'. In a preferred embodiment, the fixed frame 14' has a plurality of locking holes 143 for locking the fixed frame 14' to a side end of the rear frame 1 by screws. In this preferred embodiment, the treading torque can be calculated by the aforementioned method, and the implementation method of this preferred embodiment is similar to that of the second preferred embodiment, and thus will not be repeated.

While the invention has been described by means of specific embodiments, numerous modifications and variations could be made thereto by those skilled in the art without departing from the scope and spirit of the invention set forth in the claims.

What is claimed is:

1. A rear frame torque sensor of an electrically assisted bicycle apparatus, the apparatus comprising:
a rear frame, having an upper fork arm and a lower fork arm installed thereon, and an end of the upper fork arm and an end of the lower fork arm being coupled to each other, and an included angle θ being defined between the upper fork arm and the lower fork arm;
a first displacement detection unit, installed to the upper fork arm of the rear frame;
a second displacement detection unit, installed to the lower fork arm of the rear frame; and
a processing unit, coupled to the first displacement detection unit and the second displacement detection unit;
thereby, the processing unit converts the displacement detected by the first displacement detection unit and the second displacement detection unit into a force, and is configured to analyze a signal obtained by the first displacement detection unit and the second displacement detection unit, and removes all forces perpendicular to a road surface after a mathematical operation by the processing unit, to obtain a treading torque of a treading torque module pedaled by a rider.

2. The apparatus according to claim 1, wherein when a transmission unit transmits a tension, the processing unit converts the displacements into a force receiving value FB of the upper fork arm and a force receiving value F of the lower fork arm according to the detection results of the first displacement detection unit and the second displacement detection unit respectively and defines a treading torque τ satisfying the condition of Equation 1:

$$\tau = (F - F_B \cos \theta) \times R$$ (Equation 1), wherein R is the radius of the front sprocket.

3. The rear frame torque sensor of an electrically assisted bicycle according to claim 1, wherein the first displacement detection unit and the second displacement detection unit are formed by displacement detection devices using different physical and chemical methods simultaneously or individually.

4. The apparatus according to claim 1, wherein the first displacement detection unit and the second displacement detection unit are strain gauges, piezoelectric sensors, electromagnetic sensors, capacitive sensors or optical sensors simultaneously or individually.

5. The apparatus according to claim 1, wherein the first displacement detection unit is installed directly to the upper fork arm of the rear frame, and the second displacement detection unit is installed directly to the lower fork arm of the rear frame.

6. The apparatus according to claim 1, further comprising a fixed frame, and the fixed frame has an upper link arm and a lower link arm at an end of the fixed frame, and the other end of the fixed frame is coupled to a rear axle, and the upper link arm and the upper fork arm are engaged with each other, and the lower link arm and the lower fork arm are engaged with each other, and the first displacement detection unit is installed at the upper link arm, and the second displacement detection unit is installed at the lower link arm.

7. The apparatus according to claim 1, further comprising a fixed frame, and the fixed frame has an upper link arm and a lower link arm at an end of the fixed frame, and the other end of the fixed frame is coupled to a rear axle, and the upper link arm is fixed to a side end of the upper fork arm, and the lower link arm is fixed to a side end of the lower fork arm, and the first displacement detection unit is installed at the upper link arm, and the second displacement detection unit is installed at the lower link arm.

\* \* \* \* \*